US00RE40265E

(19) United States
(12) Reissued Patent
Nippert et al.

(10) Patent Number: US RE40,265 E
(45) Date of Reissued Patent: Apr. 29, 2008

(54) RESISTANCE WELDING ELECTRODE AND PROCESS FOR MAKING

(75) Inventors: Russell A. Nippert, Columbus, OH (US); Brian E. Swank, Marengo, OH (US)

(73) Assignee: Luvata Ohio, Inc., Delaware, OH (US)

(21) Appl. No.: 10/261,133

(22) Filed: Sep. 30, 2002

Related U.S. Patent Documents

Reissue of:
(64) Patent No.: 5,914,057
Issued: Jun. 22, 1999
Appl. No.: 08/794,475
Filed: Feb. 4, 1997

(51) Int. Cl.
*B23K 35/02* (2006.01)

(52) U.S. Cl. ..... 219/119
(58) Field of Classification Search ..... 219/119, 219/120
See application file for complete search history.

(56) References Cited

U.S. PATENT DOCUMENTS

| | | | | |
|---|---|---|---|---|
| 1,848,083 | A | * 3/1932 | Wetherald | |
| 2,138,388 | A | * 11/1938 | Platz | 219/120 |
| 2,257,566 | A | * 9/1941 | Lewis | 219/120 |
| 2,402,646 | A | * 6/1946 | Leathers | 219/120 |
| 2,411,859 | A | * 12/1946 | Harwood | 219/119 |
| 2,437,740 | A | * 3/1948 | Haynes | 219/120 |
| 2,440,463 | A | * 4/1948 | Cornwall | 219/119 |
| 2,446,932 | A | * 8/1948 | Johnson | 219/120 |
| 2,472,173 | A | * 6/1949 | Powell | 219/119 |
| 2,761,953 | A | * 9/1956 | Kerr | 219/120 |
| 2,780,718 | A | * 2/1957 | Mullen | 219/120 |
| 2,795,688 | A | * 6/1957 | McCaffrey | 219/119 |
| 2,796,514 | A | * 6/1957 | Wood | 219/120 |
| 2,829,239 | A | * 4/1958 | Boretti | 219/120 |
| 2,986,273 | A | * 5/1961 | Bardgett | |
| 3,109,087 | A | * 10/1963 | Larkworthy | 219/120 |

(Continued)

FOREIGN PATENT DOCUMENTS

| | | | |
|---|---|---|---|
| DE | 2554990 | * | 6/1977 |
| GB | 661978 | * | 11/1951 |
| GB | 941947 | * | 11/1963 |
| GB | 1154323 | * | 6/1969 |
| GB | 1177351 | * | 1/1970 |
| GB | 1593895 | * | 1/1981 |
| JP | 60-130483 | * | 7/1985 |
| JP | 6-226466 | | 8/1994 |
| JP | 9-076074 | * | 3/1997 |

OTHER PUBLICATIONS

Brochure, Resistance Welding Electrode, Centerline, Windsor, Ontario, Canada, 1997.*

Brochure, Resistance Welding Products, CMW Inc., Indianapolis, Indiana, 1993.*

Brochure, Refractory metal–faced tips, Tuffaloy Products, Greer, South Carolina, 1993.*

Nadkarni et al., "A New Dispersion–Strengthened Copper", Metals Engineering Quarterly, pp. 10–15, Aug. 1976.*

SCM Metal Products, Inc. Technical Report, "Resistance Welding with GlidCop(™) Copper Dispersion Strengthened with Aluminum Oxide", pp. 1–16, Nov. 15, 1994.*

*Primary Examiner*—Clifford C. Shaw
(74) *Attorney, Agent, or Firm*—Dinsmore & Shohl LLP

(57) ABSTRACT

A process is provided for forming a resistance welding electrode. The process includes the step of providing a billet formed from a high conductivity metal. The billet includes a first portion having a first inner cavity formed therein. The process further includes the steps of inserting a dispersion strengthened copper insert into the first inner cavity of the billet thereby forming an insert-containing billet, and deforming the insert-containing billet so as to mechanically lock the insert in place in the billet. The deformed insert-containing billet comprises the resistance welding electrode.

20 Claims, 5 Drawing Sheets

U.S. PATENT DOCUMENTS 3,184,835 A * 5/1965 Coxe et al. ..... 219/119
3,197,643 A * 7/1965 Morris
3,197,857 A * 8/1965 Nippert
3,592,994 A * 7/1971 Ford ..... 219/119
3,634,934 A * 1/1972 Fitzgerald
3,779,714 A * 12/1973 Nadkarni et al.
3,803,892 A * 4/1974 Yamaguchi et al.
3,884,676 A * 5/1975 Nadkarni et al.
3,893,844 A * 7/1975 Nadkarni
3,909,581 A * 9/1975 Stone et al. ..... 219/119
3,969,156 A * 7/1976 Wallbaum
4,045,644 A * 8/1977 Shafer et al. ..... 219/119
4,071,947 A * 2/1978 Nippert ..... 219/119
4,288,024 A * 9/1981 Nippert ..... 219/119
4,345,136 A * 8/1982 Nippert ..... 219/119
4,423,617 A * 1/1984 Nippert
4,588,870 A * 5/1986 Nadkarni et al. ..... 219/119
4,954,687 A * 9/1990 Bush et al. ..... 219/119
5,015,816 A * 5/1991 Bush et al. ..... 219/119
5,334,814 A * 8/1994 Nosetani et al. ..... 219/119
5,552,573 A * 9/1996 Okita et al.

* cited by examiner

RESISTANCE WELDING ELECTRODE AND PROCESS FOR MAKING

Matter enclosed in heavy brackets [ ] appears in the original patent but forms no part of this reissue specification; matter printed in italics indicates the additions made by reissue.

BACKGROUND OF THE INVENTION

The present invention relates to welding electrodes and a process for forming same.

Resistance welding has long been used as a quick and effective method of joining metal members. The workpieces to be welded are placed in abutting relationship and a large current is caused to flow through the workpieces by a pair of opposed electrodes. The current causes the abutting surfaces of the workpieces to be heated sufficiently to effect the formation of a weld nugget. Typically, the electrodes apply significant pressure to the workpieces during welding. This facilitates the welding process by urging the material together and, also, reducing electrical resistance between each electrode tip and the adjacent workpiece material.

Since welding is accomplished by resistance heating of the material being welded, it will be appreciated that the electrodes will also be heated substantially. It is important to have an electrode of high electrical conductivity in order to minimize the power loss in the electrode and the resulting heating of the electrode.

Over time, the repeated heating and pressing operations involved in resistance welding cause breakdown, softening, mushrooming and other deformation of the electrodes. As this occurs, electrical current requirements increase with the enlarged welding tip face contacting the workpiece material until ultimately, redressing or replacement of the electrode is required. Accordingly, it is also important to have an electrode which is capable of withstanding significant distorting force at the elevated temperatures which result from the welding process so as to minimize the number of times it becomes necessary to redress or replace the electrode within a given period of time.

It is known in the art to form resistance welding electrodes by combining a copper electrode body with an anneal resistant high hardness insert. Typically, the insert performs much better than the copper material from which the electrode body was formed. However, the insert material is much more expensive than the copper used to form the electrode body.

The insert may be brazed onto the shank. The brazing step is disadvantageous as it adds an additional step to the electrode manufacturing process and, hence, increases the cost of the electrode. Furthermore, the brazing operation may anneal and soften the electrode body.

It is also known to force the insert into an electrode body via a press-fit operation. The steel welded today is often galvanized, or coated with a zinc or other softer metal coating. As a result, the resistance welding electrodes tend to stick to the coated metal. An electrode tip joined to an electrode body via a press-fit operation may pull out of the shank during resistance welding of coated materials, thus requiring replacement of the electrode.

Accordingly, there is a need for an improved resistance welding electrode which can be manufactured via an efficient and more cost effective process and, yet, is capable of performing in an acceptable manner.

SUMMARY OF THE INVENTION

This need is met by the present invention, whereby an improved resistance welding electrode and process for forming same are provided. The process involves providing a billet having an inner cavity, inserting a dispersion strengthened copper insert into the billet and deforming the insert-containing billet via cold-working operations so as to mechanically lock the insert in place in the billet. The forming operations are capable of being performed in a single process such that the electrode can be manufactured in an efficient and cost effective manner. Furthermore, because the insert is mechanically locked in place within the billet, it is unlikely that the normal amount of sticking that occurs during resistance welding of coated steel will pull the insert out of the billet. It is also noted that the billet is preferably formed from a CDA C10700 silver bearing copper which is a high conductivity material. Previously, it was generally thought that silver bearing copper should not be used in forming welding electrodes as it was thought that such material would anneal at the temperatures involved in resistance welding. However, by virtue of cooling water located in an inner cavity of the silver bearing copper main body portion and because the main body portion makes only limited, if any, contact with a workpiece, annealing of the main body portion is prevented.

In accordance with a first aspect of the present invention, a process is provided for forming a resistance welding electrode. The process includes the step of providing a billet formed from a high conductivity metal. The billet includes a first portion having a first inner cavity formed therein. The process further includes the steps of inserting a dispersion strengthened copper insert into the first inner cavity of the billet thereby forming an insert-containing billet, and deforming the insert-containing billet so as to mechanically lock the insert in place in the billet. The deformed insert-containing billet comprises the resistance welding electrode.

The step of providing a billet may comprise the steps of providing a generally cylindrical cut-off portion of high conductivity copper, and upsetting and forward extruding the cut-off portion so as to form a billet having a first inner cavity therein.

The upsetting and forward extruding step preferably further comprises the step of locating the cylindrical cut-off portion adjacent to an inner cavity of an upsetting and forward extruding die. The inner cavity of the upsetting and forward extruding die is open at one end and has an inner diameter substantially equal to an outer diameter of the billet. The die includes a forming pin located axially within the inner cavity and extends into the inner cavity from an end opposite to the open end of the inner cavity. The pin has an outer diameter substantially equal to an inner diameter of the billet first inner cavity. The upsetting and forward extruding step additionally comprises the steps of inserting the cut-off portion into the inner cavity via an insertion pin, and applying pressure to the cut-off portion via a punch to cause forward extrusion of the cut-off portion over the pin, whereby a billet is formed having an outer diameter which is greater than an outer diameter of the cut-off portion and including a first inner cavity.

The deforming step preferably comprises the steps of: placing the insert-containing billet into a first inner cavity of a first insert-containing billet forming die, the first inner cavity having a first generally rounded lower portion; applying pressure with a first forming punch to a second portion of the insert-containing billet such that the insert-containing billet is initially deformed so as to have a first shape; placing the insert-containing billet having the first shape into a second inner cavity of a second insert-containing billet forming die, the second inner cavity having a second generally rounded lower portion; applying pressure with a second forming punch to the second portion of the initially deformed insert-containing billet such that the initially deformed insert-containing billet is further deformed so as to have a second shape; placing the insert-containing billet having the second shape into a third inner cavity of a third insert-containing billet forming die; and applying pressure with a third forming punch to the second portion of the further deformed insert-containing billet such that the further deformed insert-containing billet is additionally deformed so as to have a third shape. The insert of the additionally deformed insert-containing billet has a substantially hourglass shape such that the insert is mechanically locked in place within the billet. The additionally deformed insert-containing billet comprises the resistance welding electrode.

The steps of applying pressure with the first, second and third forming punches effects the formation of a second inner cavity in the second billet portion via back extrusion.

Preferably, the process further comprises the step of staking the first portion of the billet after the inserting step and before the deforming step.

In accordance with a second aspect of the present invention, a resistance welding electrode is provided. The electrode comprises a main body formed from a high conductivity metal and including a first portion having a first inner cavity, and a dispersion strengthened copper insert provided in the first inner cavity. The main body first portion and the insert are shaped such that the insert is mechanically locked in place in the main body.

Preferably, the insert is shaped substantially like a hyperboloid and the inner cavity has a substantially similar shape.

The main body further includes a second inner cavity provided in its second portion. The second inner cavity is adapted to be supplied with a cooling fluid during a resistance welding process.

Preferably, the insert is formed from an internally oxidized copper-aluminum alloy. Preferably, the main body is formed from a high conductivity copper, such as a silver bearing copper.

In accordance with a third aspect of the present invention, a resistance welding electrode is provided and is formed from a process comprising the steps of: providing a billet formed from a high conductivity metal, the billet including a first portion having a first inner cavity formed therein; inserting a dispersion strengthened copper insert into the first inner cavity of the billet thereby forming an insert-containing billet; and deforming the insert-containing billet so as to mechanically lock the insert in place in the billet. The deformed insert-containing billet comprises the resistance welding electrode.

Accordingly, it is an object of the present invention to provide an improved low cost resistance welding electrode and process for forming same. It is further an object of the present invention to provide a resistance welding electrode having a dispersion strengthened copper insert which is mechanically locked in position within a main body formed from a high conductivity metal. These and other objects and advantages of the present invention will be apparent from the following description, the accompanying drawings and the appended claims.

DETAILED DESCRIPTION OF THE INVENTION

Figure 1A:
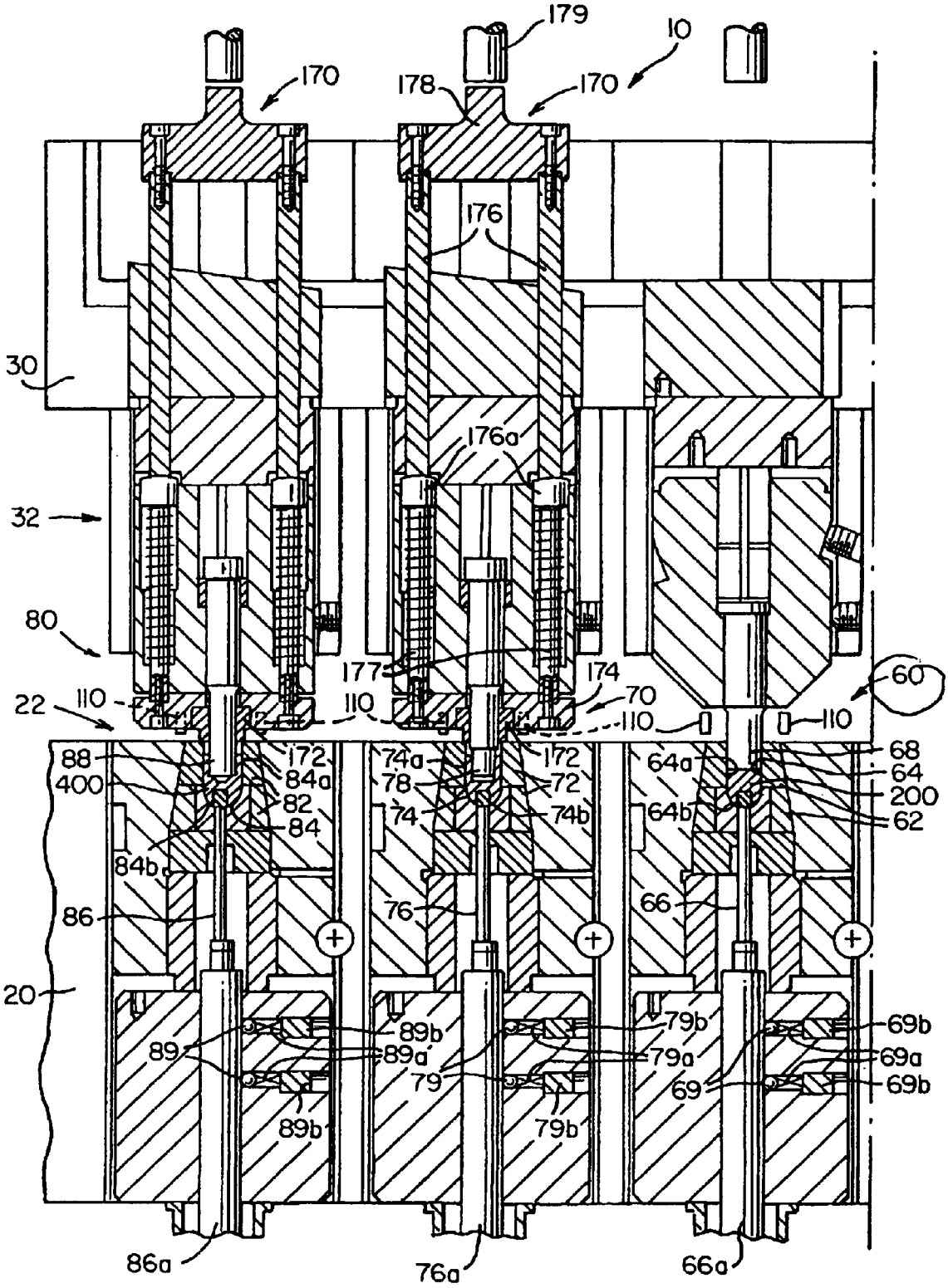
FIGS. 1A and 1B are views, partially in cross section, of a press adapted to form a resistance welding electrode in accordance with the present invention.
Figure 1B:
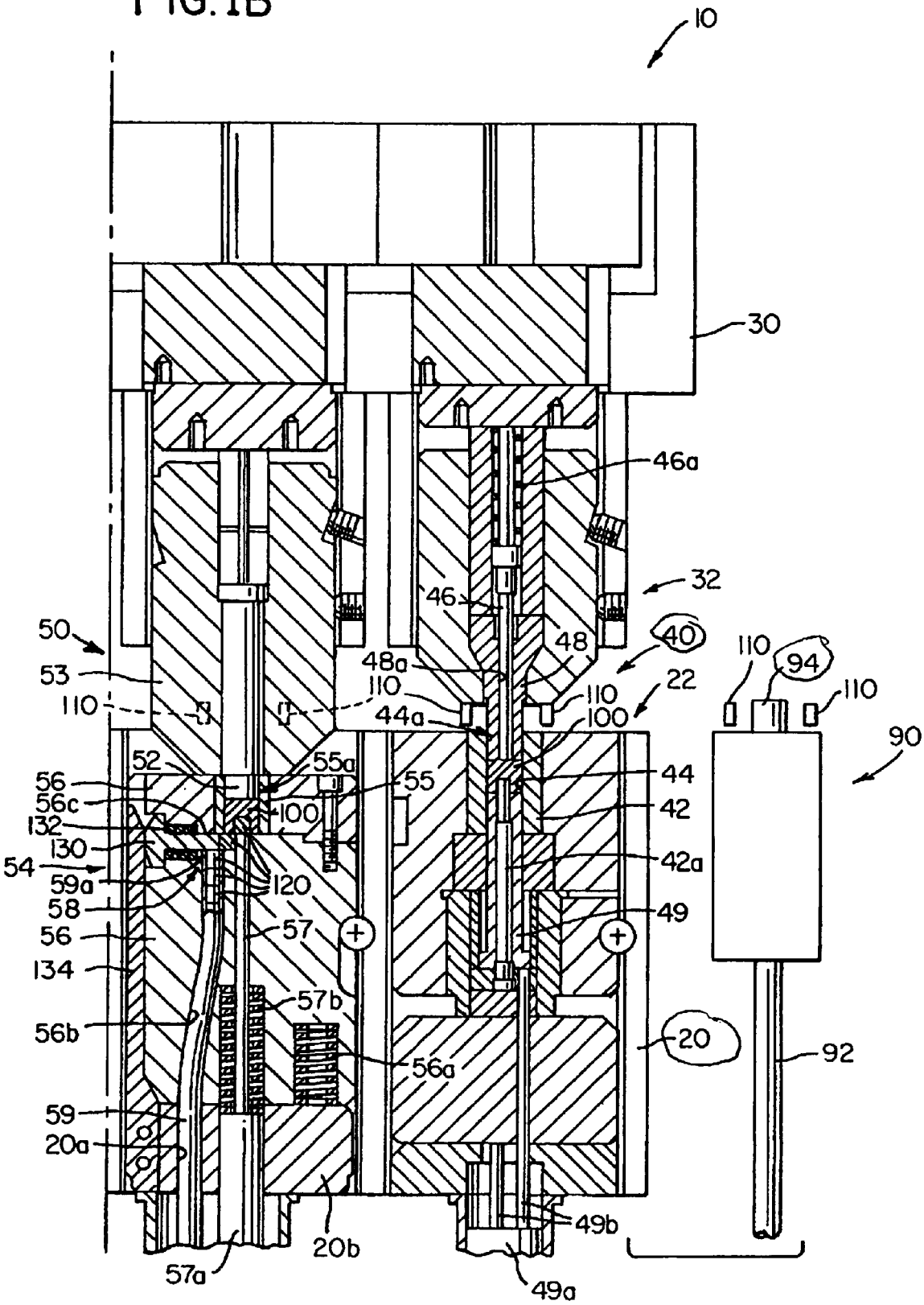
Figure 6:
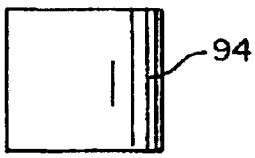
FIG. 6 is a side view of a cut-off portion of copper wire.
Figure 12:
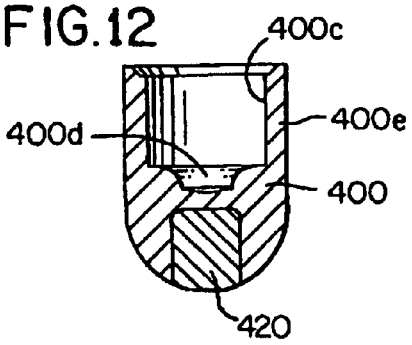
FIG. 12 is a cross-sectional view of the insert-containing billet after it has been additionally deformed in the fifth forming station in the press illustrated in FIGS. 1A and 1B.

Referring now to FIGS. 1A and 1B, a press 10 is provided having a stationary bed portion 20 and a ram portion 30 which is caused to move back and fourth relative to the bed portion 20 by a conventional drive apparatus (not shown). The bed and ram portions 20 and 30 include respectively first and second electrode forming tooling 22 and 32 which are provided at first, second, third, fourth and fifth forming stations 40, 50, 60, 70 and 80. Positioned adjacent to the first forming station 40 is a conventional cutting station 90. A high conductivity copper wire 92 is fed to the cutting station 90 where it is cut into discrete, generally cylindrical cut-off portions 94, see FIG. 6, for use in forming resistance welding electrodes 400, one of which is shown in FIG. 12. Conventional work transfer fingers 110 (shown only schematically in FIGS. 1A, 1B, 2 and 5) are provided for moving each of the discrete cut-off portions 94 from the cutting station 90 to the first forming station 40 and from the first forming station 40 through the remaining forming stations 50, 60, 70 and 80.

Figure 7:
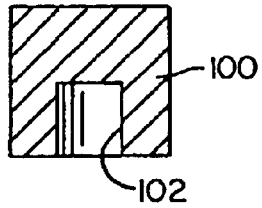
FIG. 7 is a side view, in cross section, of a billet.

The first forming station 40 comprises an upsetting and forward extruding station where the cut-off portion 94 is formed into a billet 100, see FIG. 7, having a first inner cavity 102. The forming station 40 includes an upsetting and forward extruding die 42 which is fixedly coupled to the bed portion 20 and, hence, is stationary. The die 42 includes an inner cavity 44, which is open at one end 44a and has an inner diameter substantially equal to an outer diameter of the billet 100. The die 42 also includes a forming pin 42a located axially within the inner cavity 44 and extends into the inner cavity 44 from an end opposite to the open end 44a of the inner cavity 44. The pin 42a has an outer portion with an outer diameter substantially equal to an inner diameter of the billet first inner cavity 102.

The first forming station 40 further includes an insertion pin 46 and a first station punch 48. The punch 48 is fixedly coupled to the ram portion 30 so as to move with the ram portion 30. The pin 46 extends through a bore 48a in the punch 48 and is biased in a direction toward the die 42 via a spring 46a. As the ram portion 30 moves toward the bed portion 20, the insertion pin 46 engages the cut-off portion 94 held adjacent to the die 42 via a pair of the work transfer fingers 110 and inserts the cut-off portion 94 into the inner cavity 44 of the die 42. The punch 48 then engages the cut-off portion 94 and applies sufficient pressure to the cut-off portion 94 to effect forward extrusion of the cut-off portion 94 over the pin 42a such that a billet 100 is formed, see FIG. 1B. The billet 100 has an outer diameter which is greater than an outer diameter of the cut-off portion 94.

An ejection sleeve 49 is positioned about the pin 42a and is movable relative to the pin 42a. The ejection sleeve 49 ejects the billet 100 from the die 42 after the billet 100 has been formed. In the illustrated embodiment, a base portion 49a is coupled to three pins 49b (only two of which are illustrated in FIG. 1B) which, in turn, are fixedly coupled to the sleeve 49. The base portion 49a and the three pins 49b effect movement of the sleeve 49 to eject the billet 100 in response to movement of a timing cam (not shown) which engages the base portion 49a.

Figure 2:
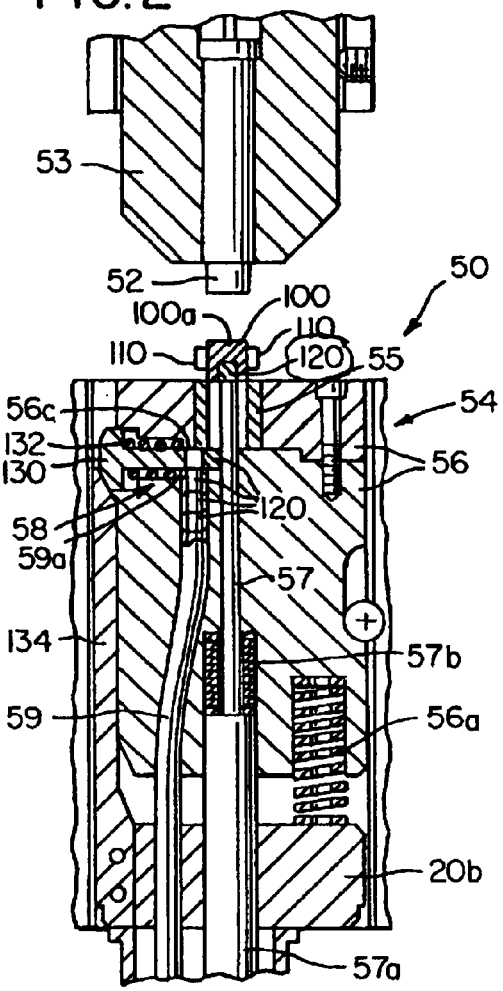
FIG. 2 is a view, partially in cross section, of a second forming station showing a billet after is has received an insert in the second forming station.

The second forming station 50 comprises a punch 52 which is fixedly coupled to the ram portion 30 so as to move with the ram portion 30. The forming station 50 also includes a die assembly 54 coupled to the bed portion 20, see FIGS. 1B, 2 and 3. The die assembly 54 comprises a die 55 having an inner cavity 55a, a die support block 56 which is movable relative to the bed portion 20, and an insert pin 57 which is movable relative to the die block 56. In the illustrated embodiment, the die block 56 is biased in a direction toward the punch 52 via three springs 56a (only one of which is shown in FIGS. 1B and 2). The die 55 is fixedly coupled to the die block 56 so as to move with the die block 56.

Figure 8:
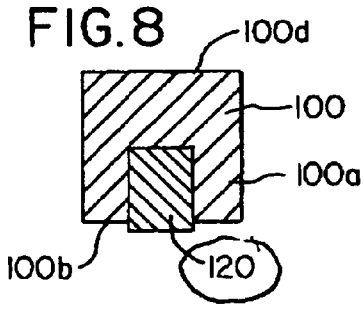
FIG. 8, is a side view, in cross section, of an insert-containing billet.

The die assembly 54 further includes an insert supply mechanism 58 for supplying dispersion strengthened copper inserts 120 one at a time into the path of movement of the insert pin 57 such that the insert pin 57 inserts a copper insert 120 into a first inner cavity 102 of a billet 100 to form an insert-containing billet 100a, one of which is shown in FIG. 8. The insert supply mechanism 58 comprises a supply conduit 59 having a plurality of inserts 120 therein. The inserts 120 are fed to the conduit 59 via a feed drive (not shown). The supply conduit 59 extends through a bore 20a provided in a support block 20b which is fixedly coupled to the bed portion 120. The supply conduit 59 is capable of moving within the bore 20a. The conduit 59 also extends through a first bore 56b in the die block 56 and is fixedly connected to the die block 56 so as to move with the die block 56. A distal end 59a of the conduit 59 terminates at an insert receiving channel 56c in the die block 56 such that the conduit 59 supplies inserts 120 to the channel 56c.

Figure 3:
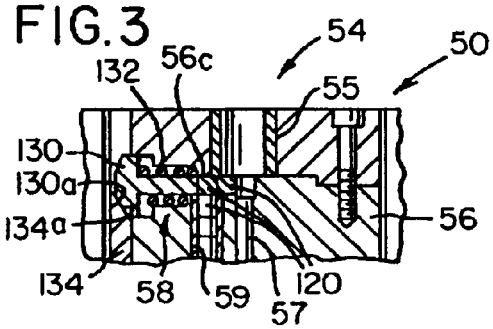
FIG. 3 is a view, partially in cross section, of a portion of a die assembly forming part of the second forming station.

The supply mechanism 58 further includes a reciprocating pin 130 which extends into the channel 56c. A spring 132 biases the pin 130 toward an outer stationary member 134 which forms part of the lower die assembly 54. The pin 130 has an outer surface 130a which is adapted to engage an outer camming surface 134a of the stationary member 134, see FIG. 3. Upon downward movement of the die block 56, the outer surface 130a of the pin 130 moves along the outer camming surface 134a of the stationary member 134 such that the pin 130 is moved inward against the force of the spring 132. As the pin 130 moves inward, it pushes two inserts 120 located in the channel 56c in a direction toward the path of movement of the insert pin 57 such that one of the inserts 120 is moved into the path of movement of the pin 57 and the other insert 120 is moved from a first position to a second position within the channel 56c. In FIG. 2, the pin 130 is shown in its home position with the single insert 120 in the channel 56c positioned in the second insert position. FIG. 3 illustrates the channel 56c after an insert 120 has been supplied to the channel 56c via the supply conduit 59 such that two inserts 120 are located within the channel 56c in the first and second positions.

As the ram portion 30 moves toward the bed portion 20, the punch 52 engages the billet 100 held adjacent to the die 55 via a pair of the work transfer fingers 110 and inserts the billet 100 into the die 55. A punch coupling block 53 is fixedly coupled to the ram portion 30 so as to move with the ram portion 30. The punch coupling block 53 moves toward the bed portion 20 with the punch 52 and engages the die block 56 to move the die block 56 inwardly against the force of the springs 56a until the die block 56 engages the support block 20b. As the billet 100 is moved to the bottom of the die inner cavity 55a via the punch 52, the insert pin 57 is caused to move in a direction toward the punch 52 via movement of a timing cam (not shown) which engages a base portion 57a of the pin 57. As the pin 57 moves toward the punch 52, it moves an insert 120, which has been positioned in its path of movement by the pin 130, into the first inner cavity 102 of the billet 100 positioned in the die 55 so as form an insert-containing billet 100a, see FIG. 8. Preferably, the insert 120 is fully inserted into the billet 100 before the billet 100 reaches the bottom of the die inner cavity 55a and engages the die block 56.

Figure 9:
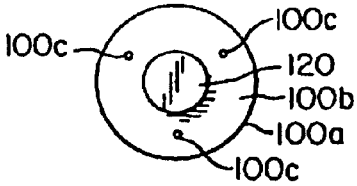
FIG. 9 is a view of the underside of the insert-containing billet illustrated in FIG. 8 and showing indentations in the billet portion of the insert-containing billet.

A surface of the die block 56 which is encircled by the die 55 is provided with three staking pins (not shown). The punch 52 applies sufficient pressure to the billet 100 such that the staking pins form three indentations 100c in a lower surface 100b of the billet 100, see FIG. 9. The staking operation effects displacement of a sufficient amount of metal in the billet 100 so as to temporarily hold the insert 120 in the billet 100 as the billet 100 is moved out of the second forming station 50 and into the third forming station 60.

As the punch 52 is removed from the die 55, the pin 57 is extended further in a direction toward the punch 52 so as to eject the insert-containing billet 100a from the die 55, see FIG. 2. The pin 57 is returned to its home position via a spring 57b which is positioned about the pin 57 and engages the die block 56 and the base portion 57a of the pin 57. Further, the die block 56 is moved to its home position, shown in FIG. 2, via the springs 56a.

From the second forming station 50, the insert-containing billet 100a is moved to the third forming station 60 where it is initially deformed so as to have a first shape. The third forming station 60 includes a first insert-containing billet forming die 62 having an inner cavity 64. The inner cavity 64 has a generally cylindrical upper portion 64a and a generally rounded lower portion 64b. The third forming station 60 further includes a punch 68 which is coupled to the ram portion 30 so as to move with the ram portion 30.

The third forming station 60 further includes a movable guide and ejecting pin 66 which is capable of moving into the inner cavity 64 via movement of a timing cam (not shown) which engages a base portion 66a of the pin 66. First and second polymeric holding members 69 frictionally engage the pin base portion 66a and maintain the pin 66 in its extended position so that it may act as a guide for the insert-containing billet 100a as it is moved into the die inner cavity 64 for forming. The holding members 69 are biased toward the pin base portion 66a via springs 69 which, in turn, are adjustably supported by set screws 69b.

As the ram portion 30 moves toward the bed portion 20, the punch 66 engages the insert-containing billet 100a held adjacent to the die 62 via a pair of the work transfer fingers 110 and inserts the insert-containing billet 100a into the die 62. The pin 66, which is in its extended position before the insert-containing billet 100a is inserted into the die 62, moves downwardly with the insert-containing billet 100a and acts as a guide for the insert-containing billet 100a as it is moved into the die inner cavity 64 for forming.

Figure 10:
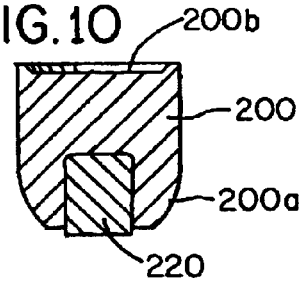
FIG. 10 is a cross-sectional view of the insert-containing billet after it has been initially deformed in the third forming station in the press illustrated in FIGS. 1A and 1B.
Figure 13:
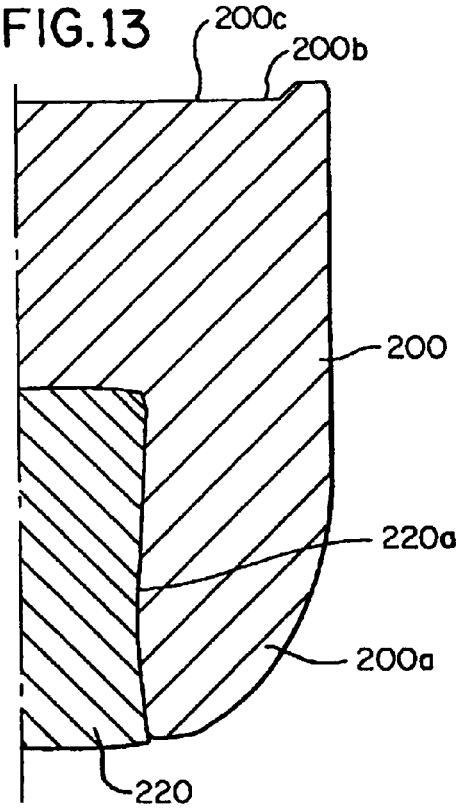
FIG. 13 is an enlarged cross-sectional view of a portion of the insert-containing billet illustrated in FIG. 10.

The punch 68 applies sufficient pressure to the insert-containing billet 100a such that it is initially deformed to a first shape. An insert-containing billet 200 having a first shape is illustrated in FIGS. 1A, 10 and 13. The insert 120 of the insert-containing billet 100a is ductile enough so as to flow with the copper billet 100 during the cold-working operation occurring in station 60. As a result, the initially deformed insert-containing billet 200 has an insert 220 with an initially deformed central portion 220a, see FIG. 13. Further, the punch 68 deforms a second portion 100d of the billet 100 such that the initially deformed insert-containing billet 200 has a slight recess 200c in its second portion 200b.

After the forming operation is completed, the pin 66 ejects the insert-containing billet 200 from the die 62.

Figure 11:
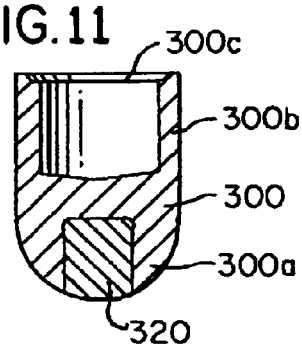
FIG. 11 is a cross-sectional view of the insert-containing billet after it has been further deformed in the fourth forming station in the press illustrated in FIGS. 1A and 1B.
Figure 14:
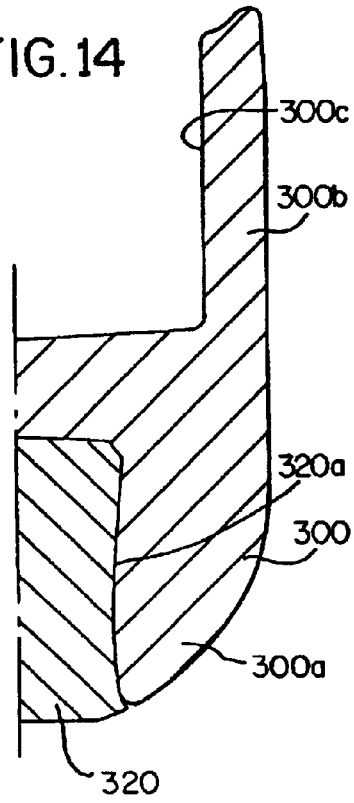
FIG. 14 is an enlarged cross-sectional view of a portion of the insert-containing billet illustrated in FIG. 11.

From the third forming station 60, the insert-containing billet 200 is moved to the fourth forming station 70 where it is further deformed so as to have a second shape, see FIGS. 11 and 14. The fourth forming station 70 includes a second insert-containing billet forming die 72 having an inner cavity 74. The inner cavity 74 has a generally cylindrical upper portion 74a and a generally rounded lower portion 74b. The fourth forming station 70 further includes a punch 78 which is coupled to the ram portion 30 so as to move with the ram portion 30.

The fourth forming station 70 further includes a movable guide and eject pin 76 which is capable of moving into the inner cavity 74 via movement of a timing cam (not shown) which engages a base portion 76a of the pin 76. First and second polymeric holding members 79 frictionally engage the pin base portion 76a to maintain the pin 76 in its extended position so that it may act as a guide for the insert-containing billet 200 as it is moved into the die inner cavity 74 for forming. The holding members 79 are biased toward the pin base portion 76a via springs 79 which, in turn, are adjustably supported by set screws 79b.

As the ram portion 30 moves toward the bed portion 20, the punch 78 engages the insert-containing billet 200 held adjacent to the die 72 via a pair of the work transfer fingers 110 and inserts the insert-containing billet 200 into the die 72. The pin 76, which is in its extended position before the insert-containing billet 200 is inserted into the die 72, moves downwardly with the insert-containing billet 200 and acts to guide the insert-containing billet 200 into the die cavity 74.

The punch 78 applies sufficient pressure to the insert-containing billet 200 which it is in the die 72 such that the insert-containing billet 200 is further deformed to a second shape. An insert-containing billet 300 having a second shape is illustrated in FIGS. 11 and 14. The insert 220 of the insert-containing billet 200 flows with the copper billet 200a during the cold-working operation occurring in station 70. As a result, the further deformed insert-containing billet 300 has an insert 320 with a further deformed central portion 320a. As noted above, while in the third forming station 60, the central portion of the insert is deformed inwardly an initial amount. Further occurring in station 70 is the back extrusion of the second portion 200b of the billet 200a about the punch 78. As a result, the insert-containing billet 300 includes a second inner cavity 300c in its second portion 300b.

Figure 4:
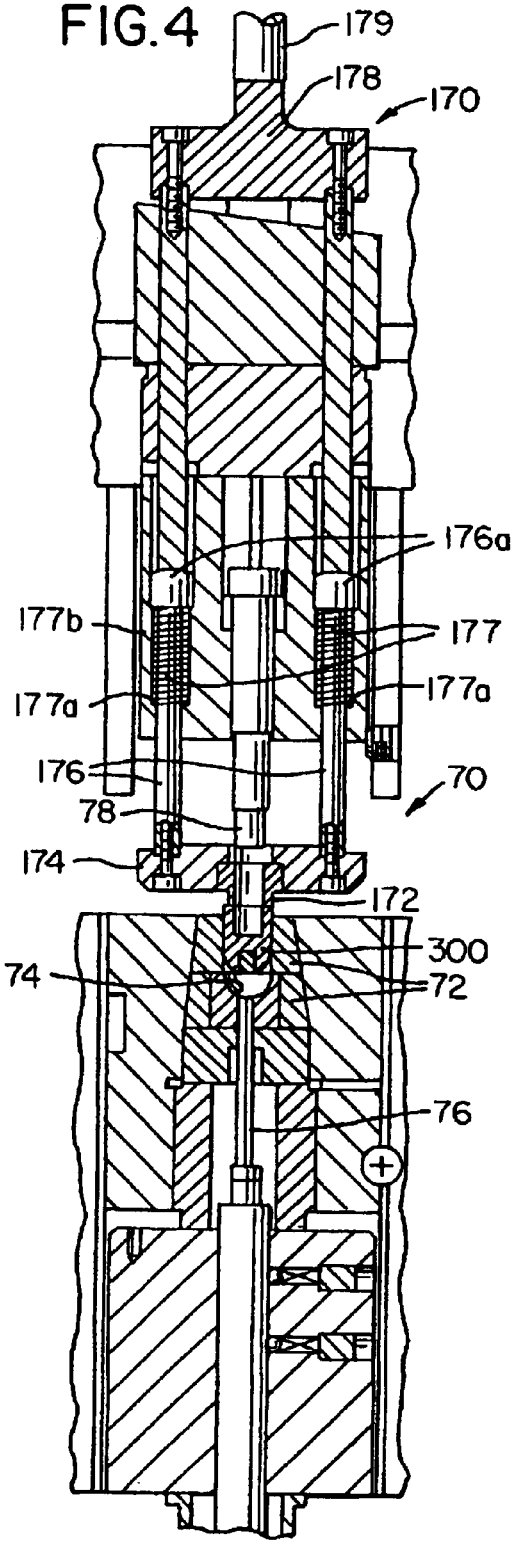
FIG. 4 is a view, partially in cross section, of a stripper mechanism stripping a workpiece from a punch at the fourth forming station.
Figure 5:
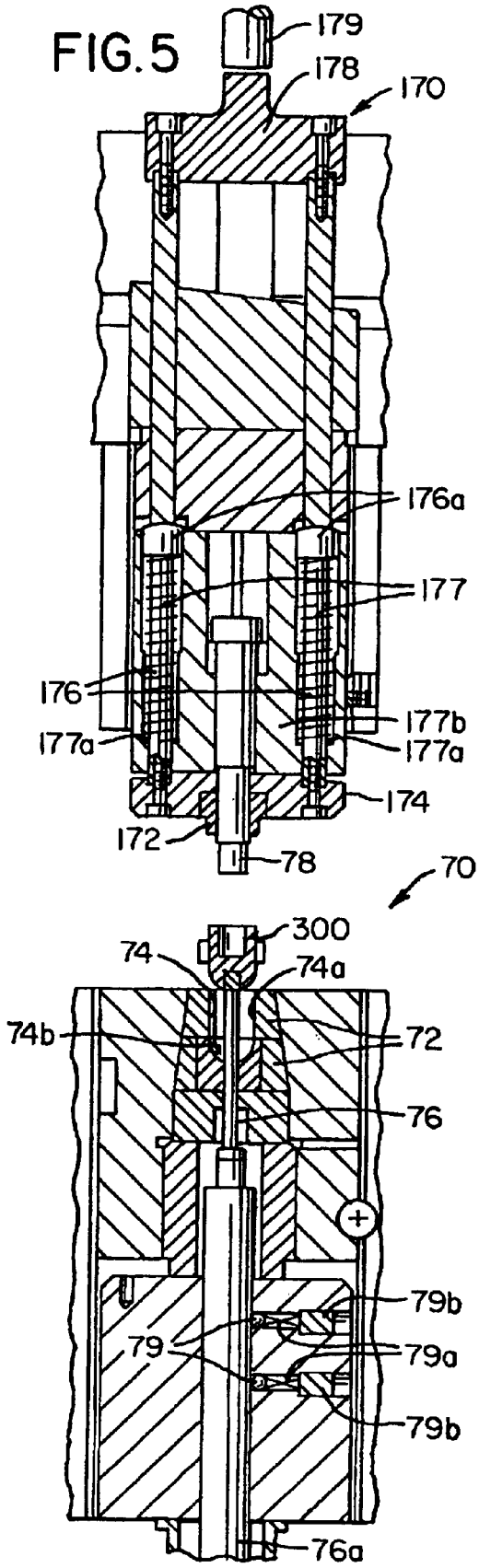
FIG. 5 is a view, partially in cross section, of the fourth forming station after an insert-containing billet is further deformed to a second shape.

A stripper mechanism 170 is provided for stripping the insert-containing billet 300 from the punch 78 as the punch 78 is moved away from the die 72, see FIGS. 4 and 5. The stripper mechanism 170 includes a workpiece engaging member 172 which is positioned about the punch 78 and is movable relative to the punch 78. The engaging member 172 is fixedly connected to a reciprocating stripper element 174 which in turn is fixedly coupled to first and second rod members 176. Springs 177 are positioned about the rod members 176 and engage enlarged portions 176a of the rod members 176 and a recess portion 177a of a block member 177b which is fixedly coupled to the ram portion 30 so as to move with the ram portion 30. The rod members 176 are fixedly coupled to a pin engaging member 178 and extend through the block member 177b.

After the cold working operation is completed at station 70, a pin 179, which is held in the position illustrated in FIG. 4 via a timing cam (not shown), engages the pin engaging member 178 such that the engaging member 172 engages the insert-containing billet 300 and strips it from the punch 78 as the punch 78 moves away from the die 72, see FIG. 4. Once the punch 78 has moved a sufficient distance from the die 72 such that the insert-containing billet 300 is removed from the punch 78, the timing cam allows the pin 179 to move to the position shown in FIG. 5, such that the springs 177 return the engaging member 172 to its home position.

After the forming operation is completed, the pin 76 ejects the insert-containing billet 300 from the die 72, see FIG. 5.

Figure 15:
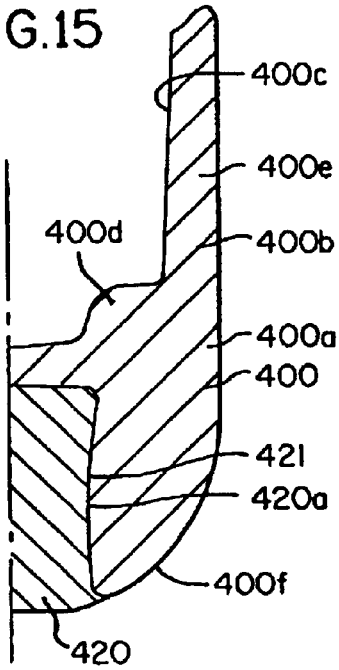
FIG. 15 is an enlarged cross-sectional view of a portion of the insert-containing billet illustrated in FIG. 12.

From the fourth forming station 70, the insert-containing billet 300 is moved to the fifth forming station 80 where it is additionally deformed to a third shape, which is the final shape of the resistance welding electrode 400, see FIGS. 12 and 15. The fifth forming station 80 includes a third insert-containing billet forming die 82 having an inner cavity 84. The inner cavity 84 has a generally cylindrical upper portion 84a and a generally rounded lower portion 84b. The fifth forming station 80 further includes a punch 88 which is coupled to the ram portion 30 so as to move with the ram portion 30.

The fifth forming station 80 further includes a movable guide and eject pin 86 which is capable of moving into the inner cavity 84 via movement of a timing cam (not shown) which engages a base portion 86a of the pin 86. First and second polymeric holding members 89 frictionally engage the pin base portion 86a to maintain the pin 86 in its extended position to permit it to act as a guide for the insert-containing billet 300 as it is moved into the die inner cavity 84 for forming. The holding members 89 are biased toward the pin base portion 86a via springs 89a which, in turn, are adjustably supported by set screws 89b.

As the ram portion 30 moves toward the bed portion 20, the punch 88 engages the insert-containing billet 300 held adjacent to the die 82 via a pair of the work transfer fingers 110 and inserts the insert-containing billet 300 into the die 82. The pin 86, which is in its extended position before the insert-containing billet 300 is inserted into the die 82, moves downwardly with the insert-containing billet 300 and acts to guide the insert-containing billet 300 into the die cavity 84.

The punch 88 applies sufficient pressure to the insert-containing billet 300 such that it is additionally deformed to a third shape. An insert-containing billet 400 having a third shape is illustrated in FIGS. 12 and 15 and comprises the resistance welding electrode of the present invention. The insert 320 of the further deformed insert-containing billet 300 flows with the copper billet 300a during the cold-working operation occurring in station 80. As a result, the additionally deformed insert-containing billet 400 has an insert 420 with a central portion 420a that has been deformed inwardly an additional amount, see FIG. 15. Thus, the insert 420, after having been deformed during the cold working operations in stations 60, 70 and 80, is shaped like an hyperboloid and, as such, is mechanically locked in place within the billet 400a. The billet 400a has a first inner cavity 421 having a shape similar to that of the insert 420 Further occurring in station 80 is the coining of the second portion 300b of the billet 300a by the punch 88. Thus, the electrode 400 has an inner cavity 400c provided with a stepped portion 400d. Further, the second portion 400b includes a tapered skirt portion 400e.

The billet 400a is also referred to herein as the main body of the electrode 400.

As the punch 88 is removed from the die 82, a stripper mechanism 170, constructed in the same manner as the stripper mechanism 170 shown in FIGS. 4 and 5 and described above, strips the insert-containing billet 400 from the punch 88 as the punch 88 is moved away from the die 82. The pin 86 then ejects the electrode 400 from the die 82.

Preferably, the copper wire 92 comprises a CDA C10700 silver bearing copper or a CDA C10500 silver bearing copper. Alternatively, another metal which is highly electrically conductive and is substantially anneal resistance below approximately 900° F. may be used. The inserts 120 are preferably formed from a dispersion strengthened copper such as GlidCop® Al-25 or GlidCop® Al-60, which are commercially available from SCM Metal Products, Inc. Dispersion strengthened copper is resistant to heading or "mushrooming" during welding cycles and, further, is resistant to sticking to galvanized and coated steels. Of course, the inserts 120 may be formed from other materials which are resistant to sticking and mushrooming.

The tapered skirt portion 400e is adapted to fit onto the arm of a conventional robotic welder. The electrode 400 is adapted to be water cooled through the second cavity 400c. The nose portion 400f of the electrode 400 is adapted to engage a workpiece during a resistance welding operation.

During the cold-working operations performed in stations 60, 70 and 80, the insert is maintained in a compressive state. This is important since dispersion strengthened copper is relatively brittle and may break if it goes into tension.

It is further contemplated that the electrode 400 may be machined after it has been formed in the press 10.

Having described the invention in detail and by reference to a preferred embodiment thereof, it will be apparent that modifications and variations are possible without departing from the scope of the invention as defined in the appended claims.

What is claimed is:

1. A process for forming a resistance welding electrode comprising the steps of:

providing a billet formed from a high conductivity metal, said billet including a first portion having a first inner cavity therein;

inserting a dispersion strengthened copper insert into said first inner cavity of said billet thereby forming an insert-containing billet; and deforming said insert-containing billet so as to mechanically lock said insert in place in said billet, said deformed insert-containing billet comprising a resistance welding electrode, *said deforming step comprising:*

*placing said insert-containing billet into a first inner cavity of a first insert-containing billet forming die, said first inner cavity having a first generally rounded lower portion;*

*applying pressure with a first forming punch to a second portion of said insert-containing billet such that said insert-containing billet is initially deformed so as to have a first shape;*

*placing said insert-containing billet having said first shape into a second inner cavity of a second insert-containing billet forming die, said second inner cavity having a second generally rounded lower portion;*

*applying pressure with a second forming punch to said second portion of said initially deformed insert-containing billet such that said initially deformed insert-containing billet is further deformed so as to have a second shape;*

*placing said insert-containing billet having said second shape into a third inner cavity of a third insert-containing billet forming die; and*

*configuring a third forming punch to include on a billet-engaging surface thereof a reduced contact area;*

*applying pressure with said third forming punch to said second portion of said further deformed insert-containing billet such that said further deformed insert-containing billet is additionally deformed so as to have a third shape, said insert of said additionally deformed insert-containing billet having a substantially hourglass shape such that said insert is mechanically locked in place within said billet.*

2. A process as set forth in claim 1, wherein said step of providing a billet comprises the steps of:

providing a generally cylindrical cut-off portion of high conductivity copper; and upsetting and forward extruding said cut-off portion so as to form a billet having a first inner cavity therein.

3. A process as set forth in claim 2, wherein said upsetting and forward extruding step comprises the steps of:

locating said cylindrical cut-off portion adjacent to an inner cavity of an upsetting and forward extruding die, said inner cavity being open at one end and having an inner diameter substantially equal to an outer diameter of said billet, said die including a forming pin located axially within said inner cavity and extending into said inner cavity from an end opposite to said open end of said inner cavity, said pin having an outer diameter substantially equal to an inner diameter of said billet first inner cavity;

inserting said cut-off portion into said inner cavity via an insertion pin; and applying pressure to said cut-off portion via a punch to cause forward extrusion of said cut-off portion over said pin, whereby a billet is formed having an outer diameter which is greater than an outer diameter of said cut-off portion and including a first inner cavity

[4. A process as set forth in claim 1, wherein said deforming step comprises the steps of:

placing said insert-containing billet into a first inner cavity of a first insert-containing billet forming die, said first inner cavity having a first generally rounded lower portion;

applying pressure with a first forming punch to a second portion of said insert-containing billet such that said insert-containing billet is initially deformed so as to have a first shape;

placing said insert-containing billet having said first shape into a second inner cavity of a second insert-containing billet forming die, said second inner cavity having a second generally rounded lower portion;

applying pressure with a second forming punch to said second portion of said initially deformed insert-containing billet such that said initially deformed insert-containing billet is further deformed so as to have a second shape;

placing said insert-containing billet having said second shape into a third inner cavity of a third insert-containing billet forming die; and applying pressure with a third forming punch to said second portion of said further deformed insert-containing billet such that said further deformed insert-containing billet is additionally deformed so as to have a third shape, said insert of said additionally deformed insert-containing billet having a substantially hourglass shape such that said insert is mechanically locked in place within said billet.]

5. A process as set forth in claim [4] *1*, wherein said steps of applying pressure with said first, second and third forming punches effects the formation of a second inner cavity in said second billet portion via back extrusion.

6. A process as set forth in claim 1, further comprising the step of staking said first portion of said billet after said inserting step and before said deforming step.

7. A resistance welding electrode comprising:

a main body formed from a high conductivity metal and including a first portion having a first inner cavity; and a dispersion strengthened copper insert provided in said first inner cavity, said main body first portion and said insert being [deformed]*shaped substantially like a hyperboloid* such that said insert is mechanically locked in place in said main body.

[8. A resistance welding electrode as set forth in claim 7, wherein said insert is shaped substantially like a hyperboloid and said inner cavity has a substantially similar shape.]

[9. A resistance welding electrode as set forth in claim 7, wherein said main body further includes a second inner cavity provided in a second portion of said main body and which is adapted to be supplied with a cooling fluid during a resistance welding process.]

10. A resistance welding electrode as set forth in claim 7, wherein said insert is formed from an internally oxidized copper-aluminum alloy.

11. A resistance welding electrode as set forth in claim 7, wherein said main body is formed from a high conductivity copper.

12. A resistance welding electrode as set forth in claim 7, wherein said main body is formed from a silver bearing copper.

13. A resistance welding electrode formed from a process comprising the steps of:

providing a billet formed from a high conductivity metal, said billet including a first portion having a first inner cavity formed therein;

inserting a dispersion strengthened copper insert into said first inner cavity of said billet thereby forming an insert-containing billet; and deforming said insert-containing billet so as to mechanically lock said insert in place in said billet, said deformed insert-containing billet comprising a resistance welding electrode, *said deforming step comprising:*

*placing said insert-containing billet into a first inner cavity of a first insert-containing billet forming die, said first inner cavity having a first generally rounded lower portion;*

*applying pressure with a first forming punch to a second portion of said insert-containing billet such that said insert-containing billet is initially deformed so as to have a first shape;*

*placing said insert-containing billet having said first shape into a second inner cavity of a second insert-containing billet forming die, said second inner cavity having a second generally rounded lower portion;*

*applying pressure with a second forming punch to said second portion of said initially deformed insert-containing billet such that said initially deformed insert-containing billet is further deformed so as to have a second shape;*

*placing said insert-containing billet having said second shape into a third inner cavity of a third insert-containing billet forming die; and*

*configuring a third forming punch to include on a billet-engaging surface thereof a reduced contact area;*

*applying pressure with said third forming punch to said second portion of said further deformed insert-containing billet such that said further deformed insert-containing billet is additionally deformed so as to have a third shape, said insert of said additionally deformed insert-containing billet having a substantially hourglass shape such that said insert is mechanically locked in place within said billet, said third shape defining a stepped portion in an inner cavity in said insert-containing billet.*

14. A resistance welding electrode as set forth in claim 13, wherein said step of providing a billet comprising the steps of:

providing a generally cylindrical cut-off portion of high conductivity copper; and upsetting and forward extruding said cut-off portion so as to form a billet having a first inner cavity.

15. A resistance welding electrode as set forth in claim 13, wherein said upsetting and forward extruding step comprises the steps of:

locating said cylindrical cut-off portion adjacent to an inner cavity of an upsetting and forward extruding die, said inner cavity being open at one end and having an inner diameter substantially equal to an outer diameter of said billet, said die including a forming pin located axially within said inner cavity and extending into said inner cavity from an end opposite to said open end of said inner cavity, said pin having an outer diameter substantially equal to an inner diameter of said billet first inner cavity;

inserting said cut-off portion into said inner cavity; and applying pressure to said cut-off via a punch to cause forward extrusion of said cut-off portion over said pin, whereby a billet is formed having an outer diameter which is greater than an outer diameter of said cut-off portion and including a first inner cavity.

[16. A resistance welding electrode as set forth in claim 13, wherein said deforming step comprises the steps of:

placing said insert-containing billet into a first inner cavity of a first insert-containing billet forming die, said first inner cavity having a first generally rounded lower portion;

applying pressure with a first forming punch to a second portion of said insert-containing billet such that said insert-containing billet is initially deformed so as to have a first shape, placing said insert-containing billet having said first shape into a second inner cavity of a second insert-containing billet forming die, said second inner cavity having a second generally rounded lower portion;

applying pressure with a second forming punch to said second portion of said initially deformed insert-containing billet such that said initially deformed insert-containing billet is further deformed so as to have a second shape;

placing said insert-containing billet having said second shape into a third inner cavity of a third insert-containing billet forming die; and applying pressure with a third forming punch to said second portion of said further deformed insert-containing billet such that said further deformed insert-containing billet is additionally deformed so as to have a third shape, said insert of said additionally deformed insert-containing billet having an altered shape such that said insert is mechanically locked within said billet.]

17. A resistance welding electrode as set forth in claim [16] *13*, wherein said insert of said additionally deformed insert-containing billet is shaped substantially like a hyperboloid.

18. A resistance welding electrode as set forth in claim [16] *13*, wherein said steps of applying pressure with said first, second and third forming punches effects the formation of a second inner cavity in said second billet portion via back extrusion.

19. A resistance welding electrode as set forth in claim 13, wherein said billet is formed from a high conductivity copper

20. A resistance welding electrode as set forth in claim 13, wherein said billet is formed from a silver bearing copper.

21. A resistance welding electrode comprising:

a main body formed from a silver bearing copper material and including*:* a first portion having a first inner cavity; and

*a second portion having a second inner cavity, said second portion adapted to be supplied with a cooling fluid during a resistance welding process, said second inner cavity defined by a stepped portion disposed therein; and* a dispersion strengthened copper insert provided in said first inner cavity*, said first portion and said insert being shaped substantially like a hyperboloid such that said insert is mechanically locked in place in said main body, said insert disposed relative to said first inner cavity such that a lower portion of said insert that projects lengthwise beyond said main body also projects widthwise to form an enhanced common boundary between said insert and said main body*.

[22. An electrode as set forth in claim 21, wherein said main body first portion and said insert are shaped such that said insert is mechanically locked in said main body.]

*23. A process as set forth in claim 1, wherein during at least the portion of said step of deforming said insert-containing billet where said billet is additionally deformed such that said insert has said substantially hourglass shape that is mechanically locked in place within said billet, said insert is maintained in a compressive state.*

*24. A process as set forth in claim 1, including the additional step of configuring said second forming punch to include a diameter greater than said insert.*

*25. A process as set forth in claim 13, including the additional step of configuring said second forming punch to include a diameter greater than said insert.*

* * * * *